(12) United States Patent
Kanai

(10) Patent No.: US 12,347,166 B2
(45) Date of Patent: Jul. 1, 2025

(54) IMAGE PROCESSING SEQUENCE GENERATION METHOD, IMAGE PROCESSING SEQUENCE GENERATION DEVICE, AND COMPUTER PROGRAM

(71) Applicant: SEIKO EPSON CORPORATION, Tokyo (JP)

(72) Inventor: Masashi Kanai, Azumino (JP)

(73) Assignee: SEIKO EPSON CORPORATION (JP)

( * ) Notice: Subject to any disclaimer, the term of this patent is extended or adjusted under 35 U.S.C. 154(b) by 349 days.

(21) Appl. No.: 18/192,780

(22) Filed: Mar. 30, 2023

(65) Prior Publication Data
US 2023/0316707 A1 Oct. 5, 2023

(30) Foreign Application Priority Data
Mar. 31, 2022 (JP) .................................. 2022-058802

(51) Int. Cl.
G06K 9/00 (2022.01)
G06V 10/74 (2022.01)

(52) U.S. Cl.
CPC .................................. *G06V 10/761* (2022.01)

(58) Field of Classification Search
None
See application file for complete search history.

(56) References Cited

U.S. PATENT DOCUMENTS

2023/0030595 A1* 2/2023 Sun ...................... G06V 10/776

FOREIGN PATENT DOCUMENTS

JP 2007-087055 A 4/2007

* cited by examiner

*Primary Examiner* — SJ Park
(74) *Attorney, Agent, or Firm* — Harness, Dickey & Pierce, P.L.C.

(57) ABSTRACT

An image processing sequence generation method includes using a reference table to generate a plurality of image processing sequences so as to have a probability relationship where an input-side sequence element having a high con-nection reference value with respect to an output-side sequence element has a high connection probability of being connected to the output-side sequence element.

9 Claims, 17 Drawing Sheets

| FILTER TYPE | NUMBER OF INPUTS | NUMBER OF OUTPUTS | APPEARANCE RANGE |
|---|---|---|---|
| FtA | 1 | 1 | $0 \leq VG < 0.167$ |
| FtB | 1 | 1 | $0.167 \leq VG < 0.333$ |
| FtC | 1 | 1 | $0.333 \leq VG < 0.500$ |
| FtD | 2 | 1 | $0.500 \leq VG < 0.667$ |
| FtE | 2 | 1 | $0.667 \leq VG < 0.833$ |
| in | 0 | 1 | $0.833 \leq VG \leq 1.000$ |

| FILTER TYPE | NUMBER OF INPUTS | NUMBER OF OUTPUTS | APPEARANCE RANGE |
|---|---|---|---|
| FtA | 1 | 1 | $0 \leq VG < 0.167$ |
| FtB | 1 | 1 | $0.167 \leq VG < 0.333$ |
| FtC | 1 | 1 | $0.333 \leq VG < 0.500$ |
| FtD | 2 | 1 | $0.500 \leq VG < 0.667$ |
| FtE | 2 | 1 | $0.667 \leq VG < 0.833$ |
| in | 0 | 1 | $0.833 \leq VG \leq 1.000$ |

FIG. 4

|  | No.1 | No.2 | No.3 | No.4 | No.5 | No.6 | ... | No.10 |
|---|---|---|---|---|---|---|---|---|
| IV1 | 0.534 | 0.292 | 0.462 | 0.856 | 0.138 | 0.932 | ... | 1.000 |
| IV2 | 0.314 | 0.742 | 0.112 | 0.412 | 0.995 | 0.366 | ... | 0.925 |
| IV5 | 0.293 | 0.122 | 0.429 | 0.581 | 0.303 | 0.442 | ... | 0.586 |

FIG. 5

| INPUT-SIDE IDENTIFIER | INPUT-SIDE SEQUENCE ELEMENT | NUMBER OF INPUTS | NUMBER OF OUTPUTS | OUTPUT-SIDE IDENTIFIER | | | | | |
|---|---|---|---|---|---|---|---|---|---|
| | | | | OUTPUT-SIDE SEQUENCE ELEMENT | | | | | |
| | | | | 0 | 1 | 2 | 3 | 4 | 5 |
| | | | | FtA | FtB | FtC | FtD | FtE | out |
| 0 | FtA | 1 | 1 | 0.670 | 1.000 | 0.478 | 0.811 | 0.668 | 0.628 |
| 1 | FtB | 1 | 1 | 0.138 | 0.362 | 0.086 | 0.171 | 0.943 | 0.571 |
| 2 | FtC | 1 | 1 | 0.124 | 0.817 | 0.984 | 0.205 | 0.734 | 0.711 |
| 3 | FtD | 2 | 1 | 0.394 | 0.587 | 0.461 | 0.392 | 0.194 | 0.508 |
| 4 | FtE | 2 | 1 | 0.191 | 0.453 | 0.614 | 0.580 | 0.903 | 0.686 |
| 5 | in | 0 | 1 | 0.318 | 0.035 | 0.543 | 0.449 | 0.806 | 0.379 |

FIG. 7

| INPUT-SIDE IDENTIFIER | INPUT-SIDE SEQUENCE ELEMENT | NUMBER OF INPUTS | NUMBER OF OUTPUTS | OUTPUT-SIDE IDENTIFIER | | | | | |
|---|---|---|---|---|---|---|---|---|---|
| | | | | 0 | 1 | 2 | 3 | 4 | 5 |
| | | | | OUTPUT-SIDE SEQUENCE ELEMENT | | | | | |
| | | | | FtA | FtB | FtC | FtD | FtE | out |
| 0 | FtA | 1 | 1 | 0 | 0 | 0 | 0 | 0 | 0 |
| 1 | FtB | 1 | 1 | 0 | 0 | 0 | 0 | 0 | 0 |
| 2 | FtC | 1 | 1 | 0 | 0 | 0 | 0 | 0 | 0 |
| 3 | FtD | 2 | 1 | 0 | 0 | 0 | 0 | 0 | 0 |
| 4 | FtE | 2 | 1 | 0 | 0 | 0 | 0 | 0 | 0 |
| 5 | in | 0 | 1 | 0 | 0 | 0 | 0 | 0 | 0 |

FIG. 10

| INPUT-SIDE IDENTIFIER | INPUT-SIDE SEQUENCE ELEMENT | NUMBER OF INPUTS | NUMBER OF OUTPUTS | OUTPUT-SIDE IDENTIFIER | | | | | |
|---|---|---|---|---|---|---|---|---|---|
| | | | | 0 | 1 | 2 | 3 | 4 | 5 |
| | | | | OUTPUT-SIDE SEQUENCE ELEMENT | | | | | |
| | | | | FtA | FtB | FtC | FtD | FtE | out |
| 0 | FtA | 1 | 1 | 0 | 0 | 0 | 0.783 | 0 | 0 |
| 1 | FtB | 1 | 1 | 0 | 0 | 0 | 0.783 | 0 | 0 |
| 2 | FtC | 1 | 1 | 0 | 0.783 | 0 | 0 | 0 | 0 |
| 3 | FtD | 2 | 1 | 0 | 0 | 0 | 0 | 0 | 0.783 |
| 4 | FtE | 2 | 1 | 0 | 0 | 0.783 | 0 | 0 | 0 |
| 5 | in | 0 | 1 | 0.783 | 0 | 0 | 0 | 0 | 0 |

FIG. 11

| INPUT-SIDE SEQUENCE ELEMENT | NUMBER OF INPUTS | OUTPUT-SIDE SEQUENCE ELEMENT | | NUMERICAL VALUE RANGE IN WHICH INPUT-SIDE SEQUENCE ELEMENT APPEARS |
|---|---|---|---|---|
| | | out | UPPER LIMIT THRESHOLD VALUE | |
| FtA | 1 | 0.628 | 0.180 | $0 \leq VG < 0.180$ |
| FtB | 1 | 0.571 | 0.344 | $0.180 \leq VG < 0.344$ |
| FtC | 1 | 0.711 | 0.549 | $0.344 \leq VG < 0.549$ |
| FtD | 2 | 0.508 | 0.694 | $0.549 \leq VG < 0.694$ |
| FtE | 2 | 0.686 | 0.891 | $0.694 \leq VG < 0.891$ |
| in | 0 | 0.379 | 1.000 | $0.891 \leq VG \leq 1.000$ |

↑
ARV

FIG. 15

| INPUT-SIDE SEQUENCE ELEMENT | NUMBER OF INPUTS | OUTPUT-SIDE SEQUENCE ELEMENT | | NUMERICAL VALUE RANGE IN WHICH INPUT-SIDE SEQUENCE ELEMENT APPEARS |
|---|---|---|---|---|
| | | FtE | UPPER LIMIT THRESHOLD VALUE | |
| FtA | 1 | 0.668 | 0.157 | $0 \leq VG < 0.157$ |
| FtB | 1 | 0.943 | 0.379 | $0.157 \leq VG < 0.379$ |
| FtC | 1 | 0.734 | 0.552 | $0.379 \leq VG < 0.552$ |
| FtD | 2 | 0.194 | 0.598 | $0.552 \leq VG < 0.598$ |
| FtE | 2 | 0.903 | 0.810 | $0.598 \leq VG < 0.810$ |
| in | 0 | 0.806 | 1.000 | $0.810 \leq VG \leq 1.000$ |

↑
ARV

FIG. 16

| INPUT-SIDE SEQUENCE ELEMENT | NUMBER OF INPUTS | OUTPUT-SIDE SEQUENCE ELEMENT | | NUMERICAL VALUE RANGE IN WHICH INPUT-SIDE SEQUENCE ELEMENT APPEARS |
| --- | --- | --- | --- | --- |
| | | FtA | UPPER LIMIT THRESHOLD VALUE | |
| FtA | 1 | 0.670 | 0.365 | $0 \leq VG < 0.365$ |
| FtB | 1 | 0.138 | 0.440 | $0.365 \leq VG < 0.440$ |
| FtC | 1 | 0.124 | 0.508 | $0.440 \leq VG < 0.508$ |
| FtD | 2 | 0.394 | 0.723 | $0.508 \leq VG < 0.723$ |
| FtE | 2 | 0.191 | 0.827 | $0.723 \leq VG < 0.827$ |
| in | 0 | 0.318 | 1.000 | $0.827 \leq VG \leq 1.000$ |

↑
ARV

FIG. 17

| INPUT-SIDE SEQUENCE ELEMENT | NUMBER OF INPUTS | OUTPUT-SIDE SEQUENCE ELEMENT | | NUMERICAL VALUE RANGE IN WHICH INPUT-SIDE SEQUENCE ELEMENT APPEARS |
|---|---|---|---|---|
| | | FtB | UPPER LIMIT THRESHOLD VALUE | |
| FtA | 1 | 1.000 | 0.307 | $0 \leq VG < 0.307$ |
| FtB | 1 | 0.362 | 0.418 | $0.307 \leq VG < 0.418$ |
| FtC | 1 | 0.817 | 0.669 | $0.418 \leq VG < 0.669$ |
| FtD | 2 | 0.587 | 0.850 | $0.669 \leq VG < 0.850$ |
| FtE | 2 | 0.453 | 0.989 | $0.850 \leq VG < 0.989$ |
| in | 0 | 0.035 | 1.000 | $0.989 \leq VG \leq 1.000$ |

↑
ARV

FIG. 18

IMAGE PROCESSING SEQUENCE GENERATION METHOD, IMAGE PROCESSING SEQUENCE GENERATION DEVICE, AND COMPUTER PROGRAM

The present application is based on, and claims priority from JP Application Serial Number 2022-058802, filed Mar. 31, 2022, the disclosure of which is hereby incorporated by reference herein in its entirety.

BACKGROUND

1. Technical Field

The present disclosure relates to a technique for generating image processing sequences.

2. Related Art

In the related art, a technique for structurally representing individuals like a tree structure by using genetic programming is known (JP-A-2007-87055). In the related art, genetic programming is used to generate an image processing sequence in which a plurality of image processing filters are combined in a tree structure.

In the technique disclosed in JP-A-2007-87055, a plurality of image processing sequences are generated using genetic programming, and the image processing sequences are repeatedly evaluated for each generation to specify an image processing sequence that satisfies a reference condition. However, in the related art, there is a possibility that it is necessary to generate individuals over many generations until a desired image processing sequence is specified, and there is a case where a processing time until an image processing sequence that satisfies a reference condition is specified is extended. In particular, when the number of types of image filters used in an image processing sequence increases or when a genetic length increases, a processing time until an image processing sequence that satisfies a reference condition is specified is extended.

SUMMARY

According to a first aspect of the present disclosure, an image processing sequence generation method is provided. The image processing sequence generation method includes the steps of (a) generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, (b) performing image processing on a learning image by each of the plurality of image processing sequences to generate an output image for each of the plurality of image processing sequences, the output image being an image after the image processing, (c) comparing the output image with a target image associated with the learning image for each of the plurality of image processing sequences to calculate an evaluation value indicating a degree of similarity between the output image and the target image, and (d) using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein in the step (a), each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and the step (a) includes using the reference table to generate the plurality of image processing sequences so as to have a probability relationship where an input-side sequence element having a high connection reference value with respect to an output-side sequence element has a high connection probability of being connected to the output-side sequence element.

According to a second aspect of the present disclosure, an image processing sequence generation device is provided. The generation device includes a sequence generation unit configured to generate a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, an image processing unit configured to perform image processing on a learning image by each of the plurality of image processing sequences to generate an output image for each of the plurality of image processing sequences, the output image being an image after the image processing, and an output evaluation unit configured to compare the output image with a target image associated with the learning image for each of the plurality of image processing sequences to calculate an evaluation value indicating a degree of similarity between the output image and the target image, wherein the output evaluation unit uses a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for each element set that is a pair of an input-side sequence element and an output-side sequence element connected to each other, and the sequence generation unit uses the reference table to generate the plurality of image processing sequences so as to have a probability relationship where an input-side sequence element having a high connection reference value with respect to an output-side sequence element has a high connection probability of being connected to the output-side sequence element.

According to a third aspect of the present disclosure, a non-transitory computer-readable storage medium storing a computer program configured to cause a computer to execute generation of an image processing sequence, the computer program being configured to cause the computer to execute functions including (a) generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, (b) performing image processing on a learning image by each of the plurality of image processing sequences to generate an output image for each of the plurality of image processing sequences, the output image being an image after the image processing, (c) comparing the output image with a target image associated with the learning image for each of the plurality of image processing sequences to calculate an evaluation value indicating a degree of similarity between the output image and the target image, and (d) using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein in the function (a), each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and the function (a) includes using the reference table to generate the plurality of image processing sequences so as to have a probability relationship where an input-side sequence element having a high connection reference value with respect to an output-side sequence element has a high connection probability of being connected to the output-side sequence element.

BRIEF DESCRIPTION OF THE DRAWINGS

FIG. 4 is a diagram illustrating a gene table.
FIG. 5 is a diagram illustrating a population of one generation.
FIG. 7 is a diagram illustrating a reference table.
FIG. 10 is a first diagram illustrating reference table generation processing.
FIG. 11 is a second diagram illustrating reference table generation processing.
FIG. 15 is a second diagram illustrating processing from step S316 to step S322.
FIG. 16 is a third diagram illustrating processing from step S316 to step S322.
FIG. 17 is a fourth diagram illustrating processing from step S316 to step S322.
FIG. 18 is a fifth diagram illustrating processing from step S316 to step S322.

DESCRIPTION OF EXEMPLARY EMBODIMENTS

A. Embodiment

Figure 1:
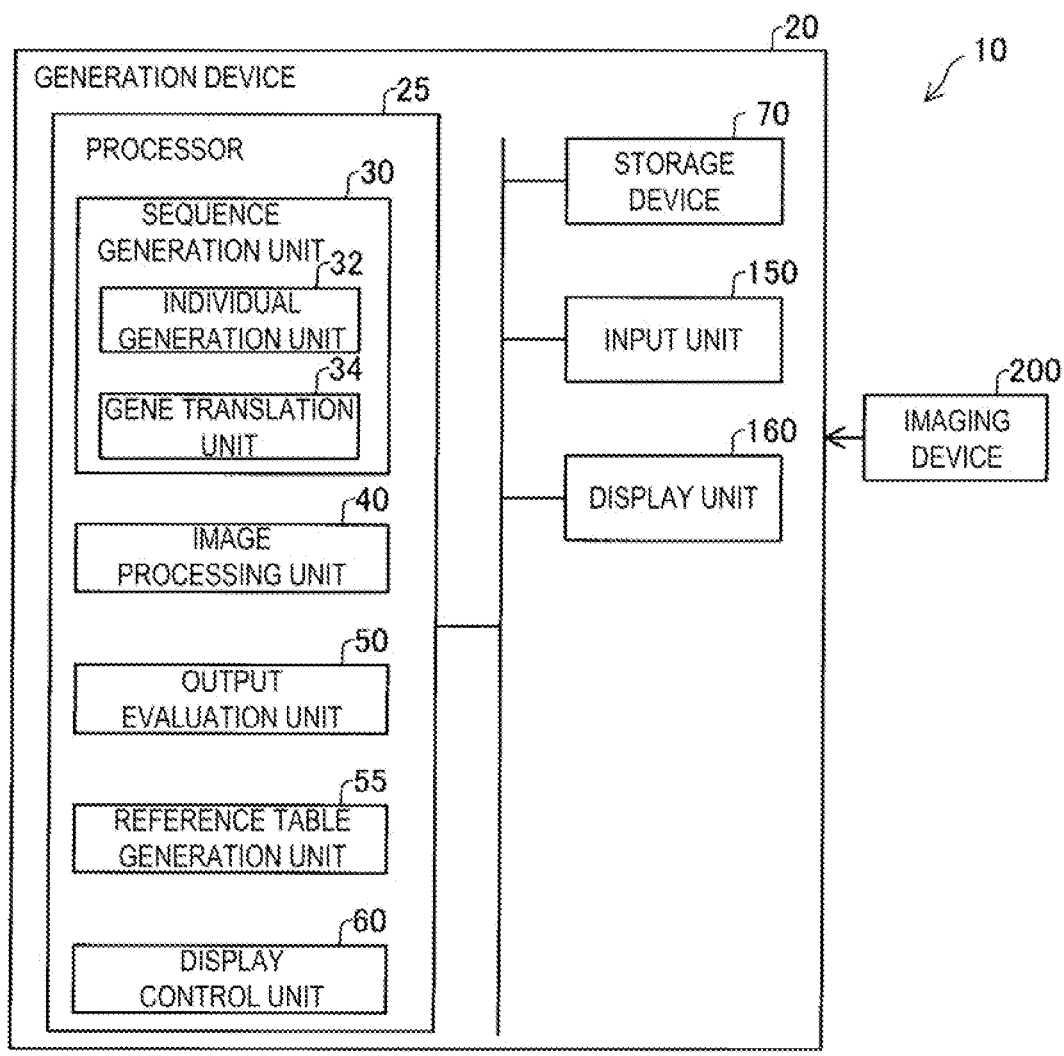
FIG. 1 is a diagram illustrating a generation system according to an embodiment.

FIG. 1 is a diagram illustrating a generation system 10 according to an embodiment. The generation system 10 includes a generation device 20 and an imaging device 200. The generation device 20 and the imaging device 200 can transmit and receive data to and from each other in a wired or wireless manner. The imaging device 200 is a camera and images an object to acquire a captured image. The captured image acquired by the imaging device 200 is transmitted to the generation device 20.

The generation device 20 has a sequence generation function of generating a specific image processing sequence DSq for obtaining a desired image after image processing, a reference table generation function executed when executing the sequence generation function, and an image processing function. The reference table generation function is a function of generating a reference table 88 to be referred to when the sequence generation function is executed. The image processing function is a function of performing image processing on an image using the image processing sequence Sq. The generation device 20 of the present embodiment automatically generates the specific image processing sequence DSq for obtaining a desired image for achieving a desired purpose based on a captured image. For example, the generation device 20 performs image processing on an image of a circuit board, which is an industrial product imaged by the imaging device 200, using the specific image processing sequence DSq and outputs a binarized image in which a defective portion is represented by a black image and the other portions are represented by a white image as a desired image. The presence or absence and the position of a defective portion are specified by a user or a device based on the binarized image, and thus an industrial product is inspected.

The sequence generation function is used to generate a plurality of image processing sequences Sq using genetic programming and specify a specific image processing sequence DSq for obtaining a desired image after image processing from among the plurality of generated image processing sequences Sq. The reference table generation function is used to generate a reference table 88 for determining to which sequence element a numerical value of a gene disposed at a gene locus corresponds. In the present embodiment, the sequence generation function, the reference table generation function, and the image processing function are installed in one generation device 20, but the present disclosure is not limited thereto. In another embodiment, the sequence generation function, the reference table generation function, and the image processing function may be installed in different devices or may be present on a cloud.

The generation device 20 is an electronic computer such as a personal computer. The generation device 20 includes a processor 25, a storage device 70, an input unit 150, and a display unit 160. The processor 25 controls the operation of the generation device 20 by executing various programs stored in the storage device 70. The detailed function of the processor 25 will be described later. The storage device 70 is constituted by a memory such as a RAM or a ROM. Various programs for realizing the functions of the processor 25 and various types of data used to generate the image processing sequence Sq are stored in the storage device 70. The storage device 70 will be described later in detail. The input unit 150 is an interface for receiving information from the outside. For example, the input unit 150 receives an input of a captured image from the imaging device 200 or receives an input of an image generated by a user using another device. The display unit 160 displays various types of information. The display unit 160 is, for example, a liquid crystal monitor.

The processor 25 executes various programs of the storage device 70 to function as a sequence generation unit 30, an image processing unit 40, an output evaluation unit 50, a reference table generation unit 55, and a display control unit 60. Note that some of the functions executed by the processor 25 may be realized by a hardware circuit. Here, in the present disclosure, a "processor" is a term including a CPU and a GPU.

The sequence generation unit 30 generates a sequence set constituted by a plurality of image processing sequences Sq having different combinations of sequence elements by structurally representing an array of genes indicated by an individual IV like a tree structure. The image processing sequence Sq is represented by a combination of a plurality of sequence elements. The sequence elements include (i) an image input layer which is a node for inputting an image, (ii) an image processing layer which is an intermediate node between the image input layer and an image output layer, the image processing layer serving as an image processing filter, and (iii) the image output layer which is a node for outputting an output image PM which is a final image after image processing. The image processing sequence Sq includes at least one image processing layer.

The sequence generation unit 30 includes an individual generation unit 32 and a gene translation unit 34. The individual generation unit 32 generates an individual IV constituted by a plurality of genes arranged one dimensionally or two dimensionally. The genes constituting the individual IV are numerical values representing the image input layer and the type of the image processing layer, the image processing filter in the present embodiment. An image input layer and a different image processing filter are allocated for each numerical value range indicating an appearance range. That is, the individual IV is generated by arranging genes corresponding to the image input layer and each of the image processing layers. The individual generation unit 32 generates a predetermined number of individuals IV for each generation. In the present embodiment, the individual generation unit 32 generates an individual IV having a predetermined genetic length by arranging genes one dimensionally. In each generation, a combination of sequence elements of the plurality of image processing sequences Sq is different. For a first generation, the individual generation unit 32 generates a population 84 constituted by a plurality of individuals IV by randomly disposing numerical values from 0 to 1 to the third decimal place as genes at each gene locus of the individual IV. For a second and subsequent generations, the individual generation unit 32 newly generates an individual IV from an individual IV having a high evaluation value to be described later among individuals IV of the previous parental generation by using at least one method out of crossover and mutation, thereby generating the population 84 which is a set of the newly generated individual IV and an individual IV maintained in the parental generation, that is, an individual IV obtained by duplicating the individual IV of the parental generation.

The gene translation unit 34 translates genes of an individual IV to generate an image processing sequence Sq represented by a tree structure by referring to a gene table 82 and a reference table 88, which will be described later, stored in the storage device 70. The gene table 82 and the reference table 88 are tables in which a connection relationship between an image processing filter corresponding to each numerical value range of numerical values that are genes and each sequence element is defined. The image processing sequence Sq is represented by an individual IV and the gene table 82 or an individual IV and the reference table 88.

The image processing unit 40 performs image processing on an image input to the image input layer and output an output image PM after the image processing from the image output layer by using the image processing sequence Sq generated by the gene translation unit 34 and the specific image processing sequence DSq stored in the storage device 70.

The output evaluation unit 50 compares an output image PM which is an image after image processing obtained by performing image processing on a learning image LM by the image processing sequence Sq indicated by the individual IV with a target image TM which is a target associated with the learning image LM to calculate an evaluation value EV indicating the degree of similarity between the output image PM and the target image TM. The output evaluation unit 50 calculates an evaluation value EV for each of a plurality of image processing sequences Sq indicated by a plurality of individuals IV in one generation G. The calculated evaluation value EV is stored in the storage device 70 in association with an individual IV. In addition, the output evaluation unit 50 determines whether or not the image processing sequence Sq satisfies a predetermined reference condition using the calculated evaluation value EV, and specifies the image processing sequence Sq that satisfies the reference condition as a specific image processing sequence DSq.

As the evaluation value EV, for example, one of a mean squared error (MSE), a peak signal-to-noise ratio (PSNR), and a structural similarity (SSIM) can be used. When MSE is used as the evaluation value, the degree of similarity SD between the output image PM and the target image TM becomes higher as the value of MSE decreases. That is, the reciprocal of MSE indicates the degree of similarity SD. When PSNR is used as the evaluation value, the degree of similarity SD between the output image PM and the target image TM becomes higher as the PSNR increases. That is, PSNR indicates the degree of similarity SD. When SSIM is used, for example, an image is divided into small regions, and a mean SSIM (MSSIM), which is an average value of SSIM calculated for each small region, is used as the evaluation value EV. When MSSIM is used as the evaluation value EV, the degree of similarity SD becomes higher as the MSSIM increases. That is, MSSIM indicates the degree of similarity SD. Note that the "degree of similarity SD" is also referred to as a "similarity SD".

The reference table generation unit 55 generates the reference table 88 using the evaluation values EV calculated by the output evaluation unit 50 and the individuals IV associated with the evaluation value EV. The reference table 88 is a table in which a connection reference value RV indicating compatibility of connection for performing image processing on an image and outputting a desired image targeting at the target image TM is determined for each element set which is a pair of sequence elements on an input side and an output side connected to each other. The desired image is an image which is similar to the target image TM. A method of generating the reference table 88 and the reference table 88 will be described later in detail.

The display control unit 60 displays various types of information about the display unit 160. The display control unit 60 displays, for example, the specific image processing sequence DSq, the output image PM, the target image TM, and the evaluation value EV on the display unit 160.

Figure 2:
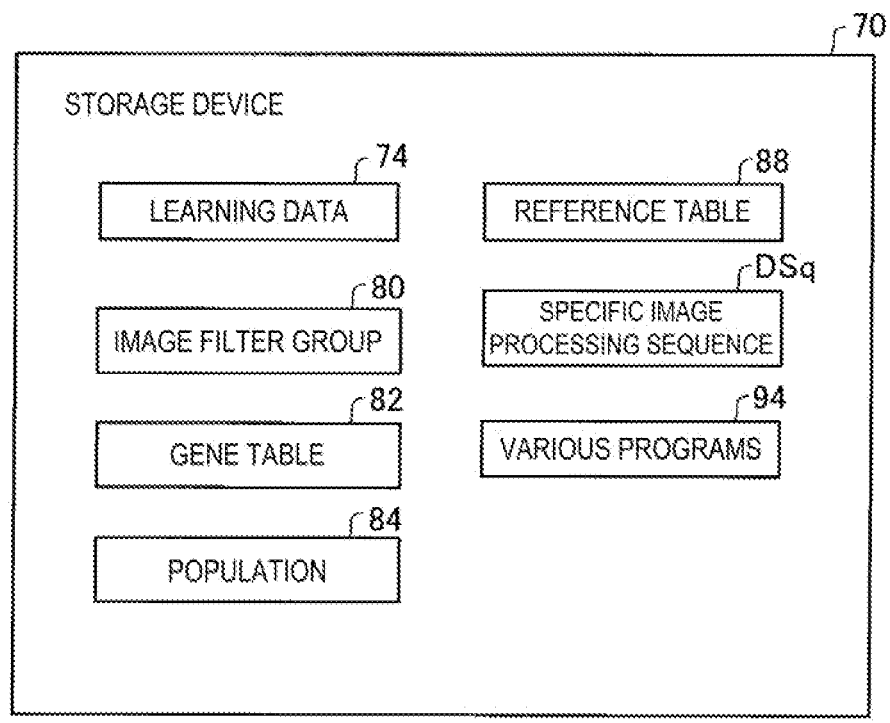
FIG. 2 is a diagram illustrating a storage device.

FIG. 2 is a diagram illustrating the storage device 70. The storage device 70 stores learning data 74, an image filter group 80, the gene table 82, the population 84, a reference table 88, a specific image processing sequence DSq, and various programs 94. The specific image processing sequence DSq is an image processing sequence Sq determined to satisfy a predetermined reference condition by the output evaluation unit 50. The specific image processing sequence DSq is represented by, for example, a layer identifier for identifying a plurality of image processing filters which are a plurality of image processing layers and the order of the layer identifiers, that is, a connection relationship. The various programs 94 are programs executed by the processor 25.

Figure 3:
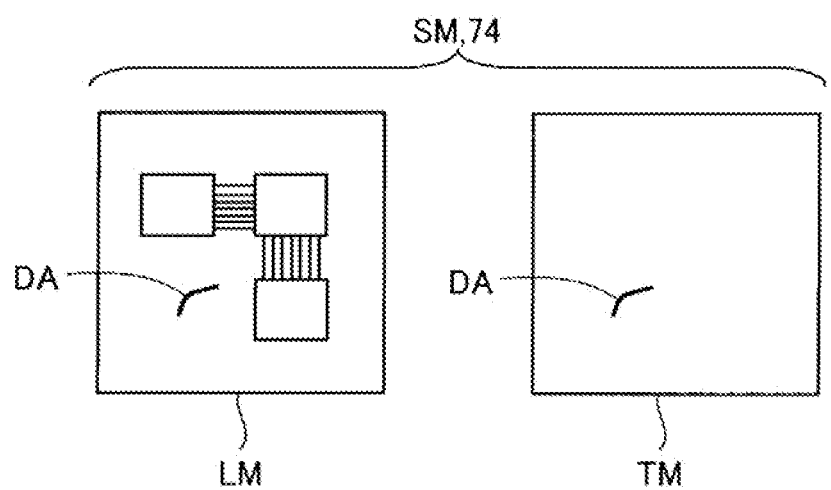
FIG. 3 is a diagram illustrating an example of learning data.

FIG. 3 is a diagram illustrating an example of the learning data 74. The learning data 74 includes a plurality of learning sets SM each including a learning image LM to be subjected to image processing by the image processing sequence Sq and a target image TM associated with the learning image LM. The learning image LM is, for example, an image of a circuit board which is an industrial product. The target image TM is a binarized image in which a defective portion DA is represented by a black image and the other portions are represented by a white image. The target image TM is generated, for example, by a user setting the defective portion DA as a black image and setting the other portions as a white image with reference to the learning image LM in which the position of a defective portion can be specified in advance. Each of the plurality of learning images LM is an image obtained by imaging circuit boards of the same type with different manufacturing numbers by the imaging device 200. An identification number is assigned to each learning image LM and each target image TM corresponding to each learning image LM.

The image filter group 80 in FIG. 2 is a set of a plurality of image filters that are candidates for sequence elements in the image processing sequence Sq. Examples of the image filter include an average value filter, a maximum value filter, a minimum value filter, a binarization filter, a moving average filter, a Laplacian filter, a Gaussian filter, a Sobel filter, a gamma correction filter, a filter for combining two images into one image, and the like. Note that the image processing filters are stored in the image filter group 80 as different image processing filters when the same type of filters have different kernel sizes or coefficients.

The gene table 82 is a table indicating a connection relationship between sequence elements that are candidates for the image processing sequence Sq and a correspondence relationship with the type of an image processing filter corresponding to a numerical value indicated by a gene.

FIG. 4 is a diagram for illustrating the gene table 82. Hereinafter, for ease of understanding, it is assumed that the image filter group 80 includes five image processing filters FtA to FtE. In practice, more than five image processing filters are stored in the image processing filter group. In the gene table 82, the number of inputs, the number of outputs, and an appearance range are defined for each filter type indicating the type of an image processing filter. The filter type is an identifier for identifying each image processing filter of the image filter group 80 and an image input layer. In FIG. 4, the filter type of the image input layer is represented by "in". The number of inputs indicates the number of sequence elements connected to an input side of the image processing filter or the image input layer. When the number of inputs is "2", data output from two sequence elements is input to the image processing filter. The number of outputs indicates the number of sequence elements connected to an output side of the image processing filter. In the present embodiment, every number of outputs is "1", and the image processing layer and the image input layer are connected to sequence elements on one output side.

In the appearance range of the gene table 82, a range of a numerical value VG of a gene is defined. In the present embodiment, numerical values of 0 to 1 are equally divided into six and set as an appearance range so that each image processing filter randomly appears in the image processing sequence Sq with an equal probability. For example, when the numerical value VG of a gene is equal to or greater than 0 and less than 0.167, the image processing filter FtA is allocated to the gene.

The population 84 illustrated in FIG. 2 is a set of a plurality of individuals IV in one generation generated by the individual generation unit 32. FIG. 5 is a diagram illustrating the population 84 of one generation G. In the present embodiment, an example in which five individuals IV1 to IV5 are generated in one generation G will be described. In each of the individuals IV1 to IV5, a plurality of loci in which genes are disposed are one dimensionally arranged. The genetic length of each of the individuals IV1 to IV5 is the same, and each of the individuals IV1 to IV5 is configured by sequentially arranging genes at loci of No. 1 to No. 10. The individual generation unit 32 dispose genes represented by numerical values from 0 to 1 to the third decimal place at each locus. That is, in the present embodiment, a value that the gene can take at each locus is numerical values from 0 to 1 to the third decimal place.

Figure 6:
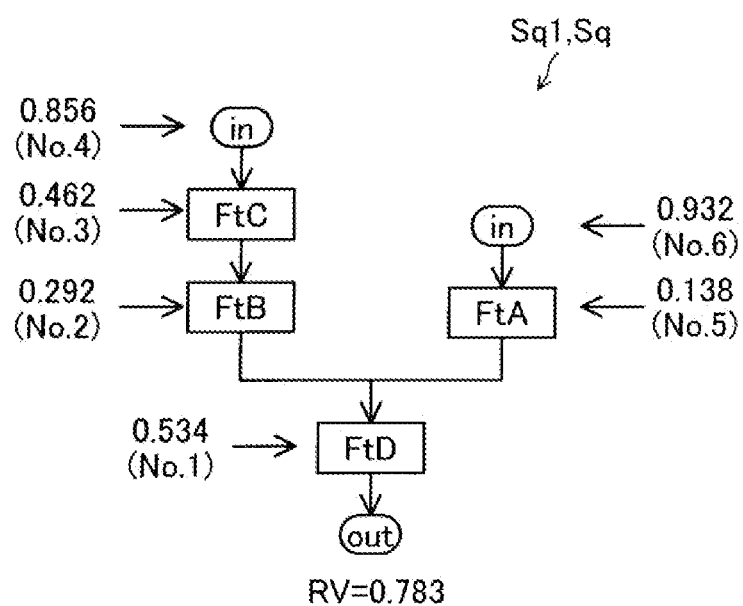
FIG. 6 is a diagram illustrating an image processing sequence of a tree structure generated by a gene translation unit.

Before a further description of FIG. 2 is given, processing for generating the image processing sequence Sq by the gene translation unit 34 will be described with reference to FIG. 6. FIG. 6 is a diagram illustrating an image processing sequence Sq having a tree structure generated by the gene translation unit 34. The image processing sequence Sq illustrated in FIG. 6 is the image processing sequence Sq1 generated based on the individual IV1 illustrated in FIG. 5.

In the present embodiment, processing for generating the image processing sequence Sq by the gene translation unit 34 includes two types of processing, that is, preliminary generation processing and specific generation processing. The preliminary generation processing is processing executed when the reference table generation function is executed to generate the reference table 88. The specific generation processing is processing executed when the sequence generation function using the reference table 88 is executed. There is a difference in that the table to be referred to when generating the image processing sequence Sq is the gene table 82 in the preliminary generation processing and the reference table in the specific generation processing. Since algorithms for generating the image processing sequence Sq from the individual IV in the preliminary generation processing and the specific generation processing are the same, the generation of the image processing sequence Sq in the preliminary generation processing will be first described below.

In the preliminary generation processing, the gene translation unit 34 generates an image processing sequence Sq having a tree structure in order from an image output layer "out" side by using the individual IV, the gene table 82, and the image filter group 80. As illustrated in FIG. 6, first, the gene translation unit 34 sets the image output layer "out" as a terminal node which is an end portion on the output side, and generates an image processing sequence Sq by connecting the sequence elements to the input side in the order of arrangement of the genes of the individual IV. The connection of the sequence elements is executed in accordance with a predetermined connection rule. In the present embodiment, the image processing sequence Sq is generated in accordance with a rule that genes are preferentially disposed from the terminal node side in the order of arrangement of the genes, and a connection destination on the left side illustrated in FIG. 6 is disposed in preference to a right connection destination. That is, the image processing layer or the image input layer "in" is disposed from the image output layer "out" side in the order of arrangement of the genes, and when the input side is divided into a plurality of layers, priority is given to the left side until the sequence on the left side becomes the image input layer "in". Note that, in the present embodiment, the number of inputs of the image output layer "out" is set to "1" in advance.

The gene translation unit 34 specifies that "0.534" is within an appearance range of the image processing filter FtD with reference to "0.534" which is the numerical value VG of the gene of No. 1 of the individual VI1 and the genes table 82. Thereby, the image processing filter FtD is connected to the input side of the image output layer "out". Next, the gene translation unit 34 disposes two sequence elements on the input side of the image processing filter FtD by specifying that the number of inputs of the image processing filter FtD is "2" with reference to the gene table 82. Specifically, the gene translation unit 34 disposes a sequence element corresponding to the gene of No. 2 of the individual VI1 in an input-side connection destination on the left side illustrated in FIG. 6. That is, the gene translation unit 34 specifies that "0.292" is within the appearance range of the image processing filter FtB with reference to "0.292" which is the numerical value VG of the gene of No. 2 and the gene table 82. Thereby, the image processing filter FtB is disposed at an input-side connection destination on the left side of the image processing filter FtD.

Next, the gene translation unit 34 disposes one sequence element on the input side of the image processing filter FtB by specifying that the number of inputs of the image processing filter FtB is "1" with reference to the image processing filter FtB represented by the gene of No. 2 and the gene table 82. Specifically, the gene translation unit 34 specifies that "0.462" is within the appearance range of the image processing filter FtC with reference to "0.462" which is the numerical value VG of the gene of No. 3 and the gene table 82. Thereby, the image processing filter FtC is disposed at the input-side connection destination of the image processing filter FtB indicated by the gene of No. 3.

Next, the gene translation unit 34 disposes one sequence element on the input side of the image processing filter FtC by specifying that the number of inputs of the image processing filter FtC is "1" with reference to the image processing filter FtC represented by the gene of No. 3 and the gene table 82. Specifically, the gene translation unit 34 specifies that "0.856" is within the appearance range of the image input layer "in" with reference to "0.856" which is the numerical value VG of the gene of No. 4 and the gene table 82. Thereby, the image input layer "in" is disposed at the input-side connection destination of the image processing filter FtC indicated by the gene of No. 3. Thereby, the generation of the sequence on the left side of the image processing sequence Sq in FIG. 6 is terminated.

Next, the gene translation unit 34 disposes a sequence element corresponding to the gene of No. 5 of the individual VI1 in the input-side connection destination on the right side illustrated in FIG. 6. That is, the gene translation unit 34 specifies that "0.138" is within the appearance range of the image processing filter FtA with reference to "0.138" which is the numerical value VG of the gene of No. 5 and the gene table 82. Thereby, the image processing filter FtA is disposed at the input-side connection destination on the right side of the image processing filter FtD.

In addition, the gene translation unit 34 disposes one sequence element on the input side of the image processing filter FtA by specifying that the number of inputs of the image processing filter FtA is "1" with reference to the image processing filter FtA represented by the gene of No. 5 and the gene table 82. Specifically, the gene translation unit 34 specifies that "0.932" is within the appearance range of the image input layer "in" with reference to "0.932" which is the numerical value VG of the gene of No. 6 and the gene table 82. Thereby, the image input layer "in" is disposed at the input-side connection destination of the image processing filter FtA indicated by the gene of No. 5. Thereby, the generation of the sequence on the right side of the image processing sequence Sq in FIG. 6 is terminated.

When all of the input-side sequence elements become the image input layer "in", the gene translation unit 34 terminates processing for generating the image processing sequence Sq using the preliminary generation processing even when all of the genes of the individual IV1 are not used. Note that, when all of the genes of the individual IV1 are used and all of the input-side sequence elements are not set to be the image input layer "in", the gene translation unit 34 sets the image input layer "in" in the remaining unconnected input-side sequence elements to thereby terminate the processing for generating the image processing sequence Sq.

The image processing sequence Sq1 represented by the individual VI1 has two image input layers "in". An image input to one image input layer "in" is subjected to image processing by the image processing filter FtC and then subjected to image processing by the image processing filter FtB, whereby a first processed image is generated. An image input to the other image input layer "in" is subjected to image processing by the image processing filter FtA, whereby a second processed image is generated. The first processed image and the second processed image are subjected to image processing by the image processing filter FtD, and one output image PM after the image processing is output by the image output layer "out".

The reference table 88 illustrated in FIG. 2 is referred to when the gene translation unit 34 generates the image processing sequence Sq from the individuals IV by the specific generation processing. FIG. 7 is a diagram illustrating the reference table 88. In the reference table 88, an input-side identifier indicating the type of an input-side sequence element being a candidate to be disposed on the input side, an output-side identifier indicating the type of an output-side sequence element being a candidate to be connected to the input-side sequence element, the number of inputs, the number of outputs, and a connection reference value RV are defined. The input-side sequence elements are the image processing filters FtA to FtE and the image input layer "in". The output-side sequence elements are the image processing filters FtA to FtE and the image output layer "out". That is, in the reference table 88, an element set which is a pair of sequence elements on the input side and the output side connected to each other is defined. The number of inputs indicates the number of sequence elements connected to the input side of the input-side sequence element. The number of outputs indicates the number of sequence elements connected to the output side of the input-side sequence element. An average value ARV as a connection reference value RV is a value defined for each element set, and indicates the compatibility of connection for performing image processing on an image and outputting a desired image targeted at a target image TM. For example, the average value ARV of the element set in which the filter FtA is connected to the input side and the filter FtC is connected to the output side is "0.478". The average value ARV is determined by a reference table generation function. In the present embodiment, the desired image is a binarized image in which a defective portion is represented by a black image and the other portions are represented by a white image, and is an image similar to the target image TM illustrated in FIG. 3.

Figure 8:
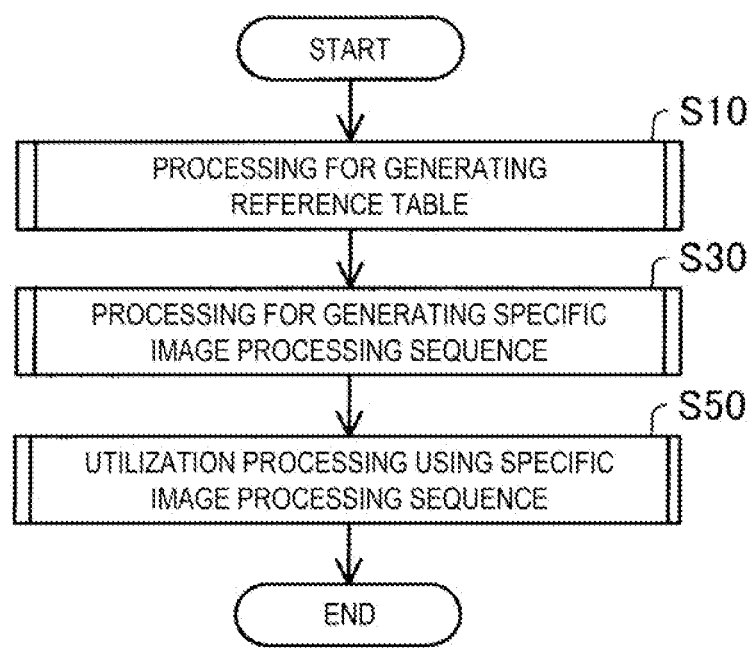
FIG. 8 is a flowchart illustrating processing executed by a generation device.

FIG. 8 is a flowchart illustrating processing executed by the generation device 20. The reference table generation function of the generation device 20 first executes processing for generating the reference table 88 in step S10. Next, in step S30, the sequence generation function of the generation device 20 executes processing for generating a specific image processing sequence DSq using the reference table 88. Next, in step S50, the image processing function of the generation device 20 executes utilization processing utilizing the specific image processing sequence DSq.

Figure 9:
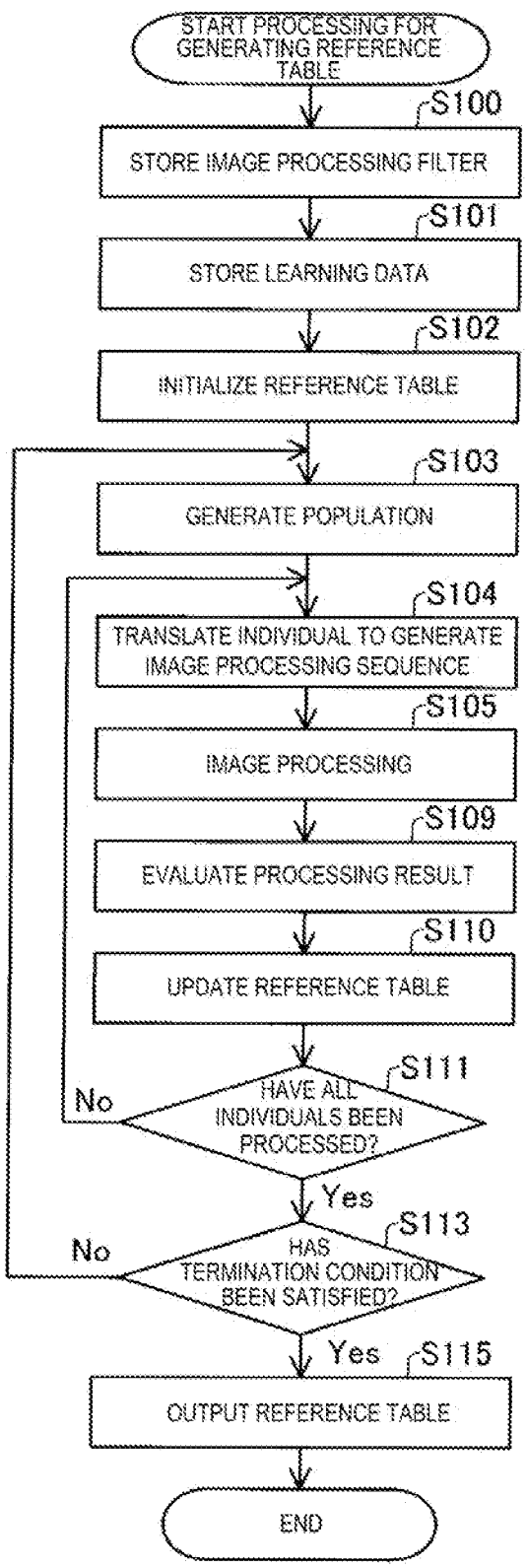
FIG. 9 is a detailed flowchart of reference table generation processing in step S10.

FIG. 9 is a detailed flowchart of the processing for generating the reference table 88 in step S10. FIG. 10 is a first diagram illustrating the processing for generating the reference table 88. FIG. 11 is a second diagram illustrating the processing for generating the reference table 88.

As illustrated in FIG. 9, first, in step S100, the storage device 70 stores a plurality of image processing filters as an image filter group 80. Step S100 is executed when a user inputs a plurality of image processing filters that are candidates to be used in the specific image processing sequence DSq to the generation device 20. In step S101, the storage device 70 stores learning data 74 constituted by a plurality of learning sets SM. Step S101 is executed when the user inputs the learning data 74 to the generation device 20. Further, in step S102, the reference table generation unit 55 initializes the reference table 88. Specifically, as illustrated in FIG. 10, the reference table generation unit 55 sets all average values ARV, which are the values of each element set in the reference table 88, to 0. Note that the order of step S100, step S101, and step S102 is not limited thereto.

Next, as illustrated in FIG. 9, in step S103, the individual generation unit 32 generates a population 84 constituted by a plurality of individuals IV for the current generation G. A population 84 in one generation G is constituted by a plurality of individuals IV1 to IV5. The generated population 84 is stored in the storage device 70. Next, in step S104, the gene translation unit 34 selects one of the individuals IV1 to IV5, and translates the selected one individual IV with reference to the gene table 82 to generate the image processing sequence Sq.

Next, in step S105, the image processing unit 40 performs image processing on a plurality of learning images LM using the image processing sequence Sq generated in step S104 to generate a plurality of output images PM. Next, in step S109, the output evaluation unit 50 compares the plurality of output images PM generated in step S105 with the target image TM associated with the learning image LM from which each of the plurality of output images PM is generated, and calculates a plurality of evaluation values EV to evaluate a processing result. The output evaluation unit 50 uses an average value of the plurality of evaluation values EV as a final evaluation value EV indicating the degree of similarity SD. Further, in step S109, the output evaluation unit 50 calculates a connection reference value RV from the final evaluation value EV. In the present embodiment, the output evaluation unit 50 uses the degree of similarity SD as the connection reference value RV. That is, when the final evaluation value EV is a mean square error, the connection reference value RV is the reciprocal of the evaluation value EV. Further, when PNSR, MSE, or SSIM is used as the final evaluation value EV, the evaluation value EV is used as the connection reference value RV.

Next, in step S110, the reference table generation unit 55 updates the reference table 88. For example, when the connection reference value RV calculated from the final evaluation value EV of the image processing sequence Sq1 illustrated in FIG. 6 is "0.783", every element set of a pair of input-side sequence element and output-side sequence element constituting the image processing sequence Sq1 is extracted, and "0.783" which is a connection reference value RV is added to the column of a reference table 110 representing the extracted element set. Here, in the column representing one element set of the reference table 110, an average value ARV divided by the number of additions is defined as a final connection reference value RV. That is, an average value $ARV_n$ of an element set calculated by the addition of an n-th connection reference value $RV_n$ is calculated using the following Equation (1).

[Math. 1]

[Math. 1]

$$ARV_n = \{RV_n + ARV_{n-1} \times (n-1)\}/n \qquad (1)$$

Here, $RV_n$ is a connection reference value to be added at an n-th time, and $ARV_{n-1}$ is an average value defined in the column of the element set until the previous time.

When the image processing sequence Sq1 includes the same element sets, the connection reference value RV may be added by the number of same element sets, or the connection reference value RV may be added only once. In the present embodiment, the connection reference value RV is added only once even when one image processing sequence Sq1 includes a plurality of same element sets. When an element set constituted by an input-side sequence element and an output-side sequence element is represented as [input-side sequence element, output-side sequence element], the image processing sequence Sq1 illustrated in FIG. 6 has the following element sets. As illustrated in FIG. 10, the reference table generation unit 55 adds the connection reference value "0.783" to the column of each element set of the corresponding reference table 88 to calculate an average value ARV for each of the following element sets.

[image processing filter FtD, image output layer "out"]
[image processing filter FtB, image processing filter FtD]
[image processing filter FtC, image processing filter FtB]
[image input layer "in", image processing filter FtC]
[image processing filter FtA, image processing filter FtD]
[image input layer "in", image processing filter FtA]

As illustrated in FIG. 9, in step S111, the reference table generation unit 55 determines whether or not the processing of step S104 to step S110 has been executed for all individuals IV of one generation G. When a determination result in step S111 is "No", the processor 25 selects one individual IV from among the individuals IV of one generation G on which step S104 to step S110 have not been performed, and executes the processing of step S104 to step S111 again.

On the other hand, when a determination result in step S111 is "Yes", the reference table generation unit 55 determines in step S113 whether or not a termination condition is satisfied. The termination condition is a condition that a processing routine from step S103 to step S111 has been executed a predetermined preliminary number of times. The predetermined preliminary number of times is set to, for example, such a number of times that the connection reference value RV is added at least once, preferably twice or more, for all of the columns of the element sets of the reference table 88. For example, the preliminary number of times is set to such an extent that a processing routine from step S104 to step S111 is executed for individuals IV of which the number is twice or more the number of element sets defined in the reference table 88.

As described above, the reference table 88 is generated by using the degree of similarity SD, which is generated using each of the plurality of image processing sequences Sq generated by the processing in step S104, for the connection reference value RV so as to have a relationship in which the input-side sequence element is connected to the output-side sequence element at a random probability in a pair of sequence elements. Thereby, it is possible to increase the possibility that an element set having high connection compatibility will be included in the image processing sequence Sq.

When the termination condition is not satisfied, the individual generation unit 32 executes step S103 again in the next processing routine. The step S103 executed again is executed by replacing individuals $IV_m$ up to the lower J-th degree of similarity SD, among individuals $IV_m1$ to $IM_m5$ of a parental generation $G_m$ generated in the step S103 in the previous processing routine, with new individuals $IV_n$. "J" is an integer equal to or greater than 1. That is, the individual generation unit 32 generates a new individual IV by duplicating an individual IV of which the degree of similarity SD does not correspond to degrees up to the lower J-th degree of similarity SD and performing at least one of crossover and mutation on the individual IV of which the degree of similarity SD does not correspond to degrees up to the J-th degree of similarity SD. Thereby, it is possible to easily generate a new image processing sequence Sq having a different combination of sequence elements from the image processing sequences Sq generated up to the previous time. The processing of step S104 and the processing of the subsequent steps are executed again for the individual $IV_n$ generated in step S103 executed again.

On the other hand, when the termination condition is satisfied, the reference table generation unit 55 outputs the reference table 88 at the point in time when the termination condition is satisfied and stores the reference table 88 in the storage device 70 in step S115.

Figure 12:
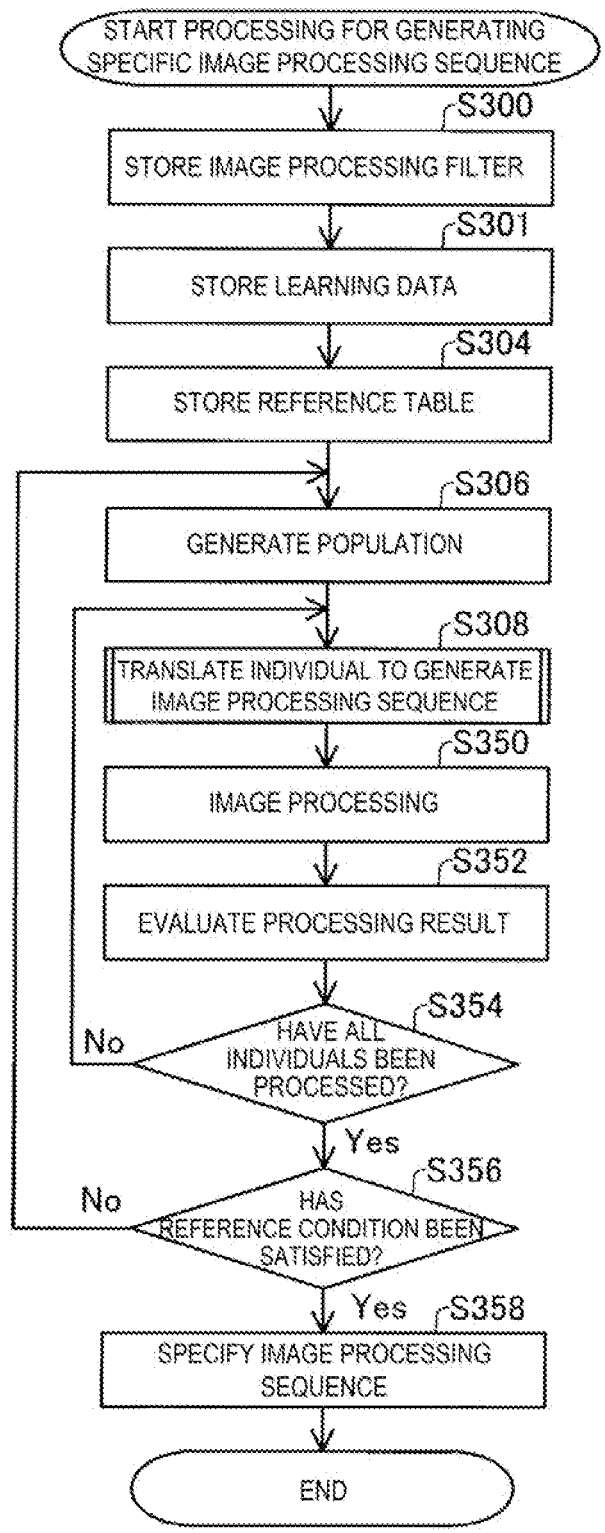
FIG. 12 is a detailed flowchart of specific image processing sequence generation processing.

FIG. 12 is a detailed flowchart of processing for generating the specific image processing sequence DSq. First, in step S300, a plurality of image processing filters are stored as the image filter group 80. Step S300 is executed when the user inputs a plurality of image processing filters that are candidates to be used in the specific image processing sequence DSq to the generation device 20. Note that, when the processing for generating the specific image processing sequence DSq is executed by the same device as the generation device 20 that has executed the processing for generating the reference table 88, the image filter group 80 is already stored in the storage device 70. Thus, in this case, step S300 can be omitted.

Further, in step S301, the storage device 70 stores the learning data 74 including the plurality of learning sets SM. Step S301 is executed when the user inputs the learning data 74 to the generation device 20. Note that, when the processing for generating the specific image processing sequence DSq is executed by the same device as the generation device 20 that has performed the processing for generating the reference table 88 and uses the same learning data 74, step S301 can be omitted. On the other hand, for example, when the learning data 74 generated based on a circuit board which is the same type as a circuit board, which is a target product serving as the source of the learning data 74 used in the processing for generating the reference table 88, but is manufactured, for example, in a different factory or a product which has the same purpose of inspecting the presence or absence of a defective portion DA, but serves as the source of the learning data 74 is different, the step S301 is executed.

Further, in step S304, the storage device 70 stores the reference table 88 generated in the processing for generating the reference table 88. Note that, when the processing for generating the specific image processing sequence DSq is executed by the same device as the generation device 20 that has executed the processing for generating the reference table 88, the reference table 88 is already stored in the storage device 70. Thus, in this case, step S304 can be omitted. Note that the order of steps S300 to S304 is not limited to the order described above.

Next, in step S306, the individual generation unit 32 generates a population 84 constituted by a plurality of individuals $IV_n$ for the current generation G. Step S306 is the same processing as step S103 in FIG. 9. That is, in step S306, a population 84 in one generation G is constituted by a plurality of individuals IV1 to IV5. The generated population 84 is stored in the storage device 70.

Next, in step S308, the gene translation unit 34 selects one of the individuals IV1 to IV5, and translates the selected individual IV with reference to the reference table 88 to generate the image processing sequence Sq. The generation of the image processing sequence Sq in step S308 is performed by the above-described specific generation processing. Step S308 will be described later in detail.

Next, in step S350, the image processing unit 40 performs image processing on a plurality of learning images LM using the image processing sequence Sq generated in step S308 to generate a plurality of output images PM.

Next, in step S352, the output evaluation unit 50 compares the plurality of output images PM generated in step S350 with the target image TM associated with the learning image LM from which each of the output images PM is generated, and calculates a plurality of evaluation values EV to evaluate a processing result. The output evaluation unit 50 uses an average value of the plurality of evaluation values EV as a final evaluation value EV indicating the degree of similarity SD between the output image PM and the target image TM.

Next, in step S354, the output evaluation unit 50 determines whether or not the processing of step S308 to step S352 has been executed for all individuals IV of one generation G. When a determination result in step S354 is "No", the processor 25 selects one individual IV from among the individuals IV of one generation G on which step S308 to step S352 have not been performed, and executes the processing of step S308 to step S352 again. That is, the image processing unit 40 performs image processing on a learning image LM by each of a plurality of image processing sequences Sq corresponding to the plurality of individuals IV constituting one generation G to generate the output image PM for each of the plurality of image processing sequences Sq. Then, the output evaluation unit 50 calculates an evaluation value EV by comparing the plurality of output images PM generated for each of the plurality of image processing sequences Sq with the corresponding target image TM.

On the other hand, when a determination result in step S354 is "Yes", the output evaluation unit 50 determines in step S356 whether or not there is an image processing sequence Sq that satisfies a predetermined reference condition by using a plurality of evaluation values EV calculated in the current generation. Specifically, the evaluation determination unit 46 determines that there is an image processing sequence Sq that satisfies a reference condition when the highest degree of similarity SDmax among the degrees of similarity SD indicated by the plurality of evaluation values EV calculated based on the plurality of individuals IV of the current generation is equal to or greater than a predetermined termination threshold value. That is, the process of step S356 is a process of specifying an image processing sequence Sq that satisfies the predetermined reference condition by using the degrees of similarity SD indicated by the plurality of evaluation values EV corresponding to the plurality of image processing sequences Sq.

When there is an image processing sequence Sq that satisfies the reference condition, the output evaluation unit 50 outputs the image processing sequence Sq that satisfies the reference condition as a specific image processing sequence DSq in step S358. The output specific image processing sequence DSq is stored in the storage device 70.

On the other hand, when there is no image processing sequence Sq that satisfies the reference condition, the processing from step S306 to step S356 is executed as the next routine. That is, in step S306 of the next routine, the individual generation unit 32 generates a sequence set by replacing a target image processing sequence Sq, which is one or more image processing sequences Sq having a low degree of similarity SD indicated by an evaluation value EV among the plurality of image processing sequences Sq generated in the previous routine, with a new image processing sequence Sq having different sequence elements. In the present embodiment, the individual generation unit 32 newly generates an individual IV of the current generation in the current routine by using at least one of crossover and mutation based on an individual IV of which the degree of similarity SD does not correspond to degrees up to the J-th degree of similarity SD, for the individuals IV of which the degrees of similarity SD correspond to degrees up to the J-th degree of similarity SD among a plurality of individuals IV of a parental generation used in the previous routine. Note that the individual generation unit 32 duplicates an individual IV of which the degree of similarity SD does not correspond to degrees up to the J-th degree of similarity SD among the plurality of individuals IV of the parental generation. A new sequence set is constituted by the duplicated individual IV and the individual IV newly generated by crossover or mutation. Then, the processing from step S308 to step S356 is executed again for the new sequence set. Note that, in another embodiment, a new individual IV may be generated using crossover or mutation based on an individual IV of which the degree of similarity SD is greater than a predetermined duplication reference value for an individual IV of which the degree of similarity SD is equal to or less than the duplication reference value among the plurality of individuals IV of the parental generation. As described above, an image processing sequence Sq having a low degree of similarity SD can be excluded from a processing target by replacing one or more image processing sequences Sq having a low degree of similarity SD with a new image processing sequence having a different combination of sequence elements and generated based on an image processing sequence Sq having a high degree of similarity SD. Thereby, it is possible to more efficiently specify an image processing sequence Sq that satisfies a reference condition.

In the processing from step S308 to step S356 for the new sequence set, the evaluation values EV calculated in the previous routines are used for image processing sequences Sq that are the same as the image processing sequences Sq constituting the sequence sets used in the previous routines. Thereby, it is not necessary to calculate an evaluation value EV again, and thus the processing efficiency of the specific image processing sequence generation processing can be improved.

Figure 13:
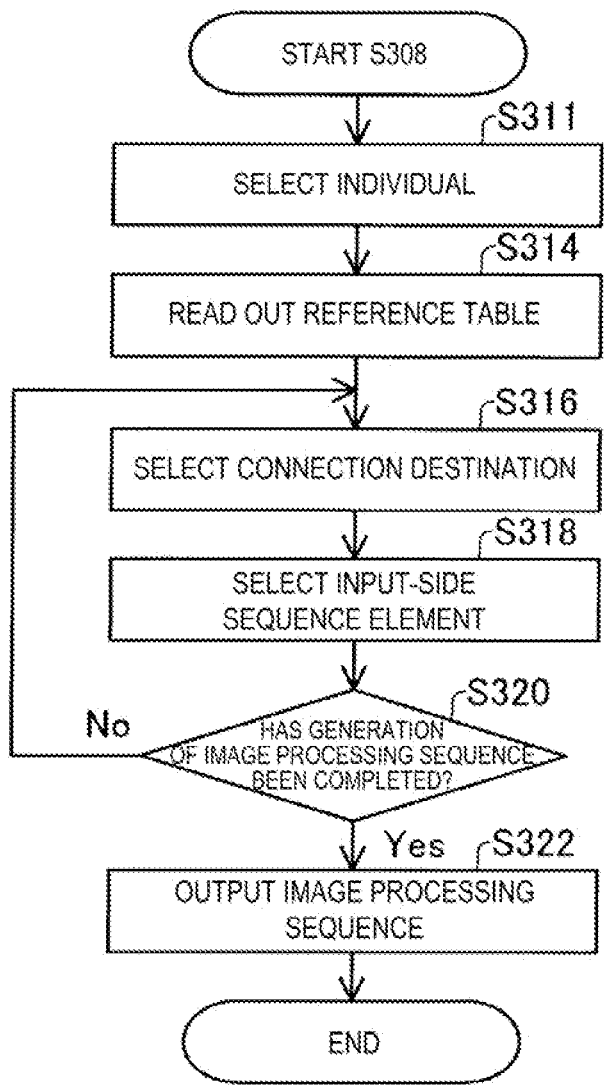
FIG. 13 is a detailed flowchart of step S308.

FIG. 13 is a detailed flowchart of step S308. First, in step S311, the gene translation unit 34 selects an unprocessed one individual from among the IV1 to IV5 constituting the current generation G. Further, in step S314, the gene translation unit 34 reads out the reference table 88 stored in the storage device 70.

Next, in step S316, the gene translation unit 34 selects one connection destination which is an unconnected output-side sequence element to which an input-side sequence element is not connected. In the present embodiment, the image output layer "out" is set as a terminal node, and sequence elements are connected in order from the image output layer "out" side. Thus, in step S316 in the first routine, the gene translation unit 34 selects the image output layer "out" as a connection destination. Note that the connection of the sequence elements is executed in accordance with a predetermined connection rule as described above. As described above, first, the gene translation unit 34 sets the image output layer "out" as a terminal node which is an end portion on the output side, and generates an image processing sequence Sq by connecting the sequence elements to the input side in the order of arrangement of genes of individuals IV. In addition, as described above, the rule is that the gene translation unit 34 preferentially disposes the genes from the terminal node side in the order of arrangement of the genes and disposes the connection destination on the left side illustrated in FIG. 6 in preference to the connection destination on the right side.

After step S316, in step S318, the gene translation unit 34 selects the input-side sequence elements to be connected to the output-side sequence elements, which are connection destinations, with reference to the reference table 88. Specifically, the gene translation unit 34 generates an image processing sequence Sq for an output-side sequence element so as to have a probability relationship in which a connection probability of being connected to the output-side sequence element increases as an input-side sequence element has a higher average value ARV as a connection reference value RV by using the reference table 88. The image processing sequence Sq having the above-described probability relationship is generated by selecting input-side sequence elements in accordance with the following selection algorithm for an input-side sequence element.

Selection Algorithm for Input-Side Sequence Element
Preconditions for the selection algorithm are as follows.
Numerical value of gene . . . VG (VG is a numerical value from 0 to 1 up to the third decimal place)
Output-side sequence element identifier . . . j Here, j is represented by an integer of 0 or more, and a different value is allocated to each output-side sequence element. In the present embodiment, 0 to 5 are allocated to the identifier j in the order of the input-side sequence elements FtA to out.

Connected input-side sequence element identifier . . . i

Here, i is represented by an integer of 0 or more, and is represented by an identifier from 0 to $N_f$. $N_f$ is a value obtained by subtracting 1 from the number of candidates for the input-side sequence element, and in the present embodiment, as illustrated in FIG. 7, since the number of input-side sequence elements is 6, $N_f$ is 5. Further, 0 to 5 are allocated to the identifier i in the order of the input-side sequence elements FtA to in. • Value of element set of reference table 88 . . . $t_{ij}$ $t_{ij}$ is the average value ARV illustrated in FIG. 7, and the suffix "ij" is an identifier for specifying an element set and corresponds to the identifiers of the input-side sequence element and the output-side sequence element. For example, $t_{12}$ indicates 0.086 which is an average value ARV of an element set in which the input-side sequence element is the image processing filter FtB and the output-side sequence element is the image processing filter FtC in FIG. 7.

In the selection algorithm, a probability $P_{ij}$ that the input-side sequence element i is connected to the input side of the output-side sequence element j is calculated by the following Equation (2).

[Math. 2]

[Math. 2]

$$P_{ij} = t_{ij} / (\Sigma_{k=0}^{N_f} t_{kj}) \quad (2)$$

Further, in the selection algorithm, an upper limit threshold value $T_{ij}$ of a numerical value range of a gene in which the input-side sequence element i is connected to the output-side sequence element j is calculated using the following Equation (3). Note that a lower limit threshold value is set to an upper limit threshold value of an input-side sequence element corresponding to a previous identifier. When there is no previous identifier, the lower limit threshold value is set to "0".

[Math. 3]

[Math. 3]

$$T_{ij} = \Sigma_{k=0}^{i} P_{kj} = (\Sigma_{k=0}^{i} t_{kj}) / (\Sigma_{k=0}^{N_f} t_{kj}) \quad (3)$$

By determining a numerical value range indicating an appearance range of genes using the above-described selection algorithm, an image processing sequence Sq is generated such that a ratio between average values ARV, which are connection reference values of input-side sequence elements being connection candidates for the same output-side sequence element, is a ratio between connection probabilities of being connected to the output-side sequence element.

The gene translation unit 34 sets a numerical value range as a different appearance range for each of the input-side sequence elements of the plurality of image processing filters FtA to FtE which are the image input layer "in" and the plurality of image processing layers by using the upper limit threshold value calculated by the above-described Equation (3). Then, the image processing filter as the image input layer "in" or the image processing layer in which numerical values of genes correspond to the set numerical value range is selected as an input-side sequence element.

After step S318, in step S320, the gene translation unit 34 determines whether or not the generation of the image processing sequence Sq has been completed. Specifically, the gene translation unit 34 determines that the generation of the image processing sequence Sq has been completed when all of the upstream nodes become the image input layer "in" and there is no unconnected node. In this case, the gene translation unit 34 outputs the image processing sequence Sq generated in step S322 to the image processing unit 40. On the other hand, when the gene translation unit 34 determines that the generation of the image processing sequence Sq has not been completed, the gene translation unit 34 executes the processing of step S316 and the processing of the subsequent steps again.

Figure 14:
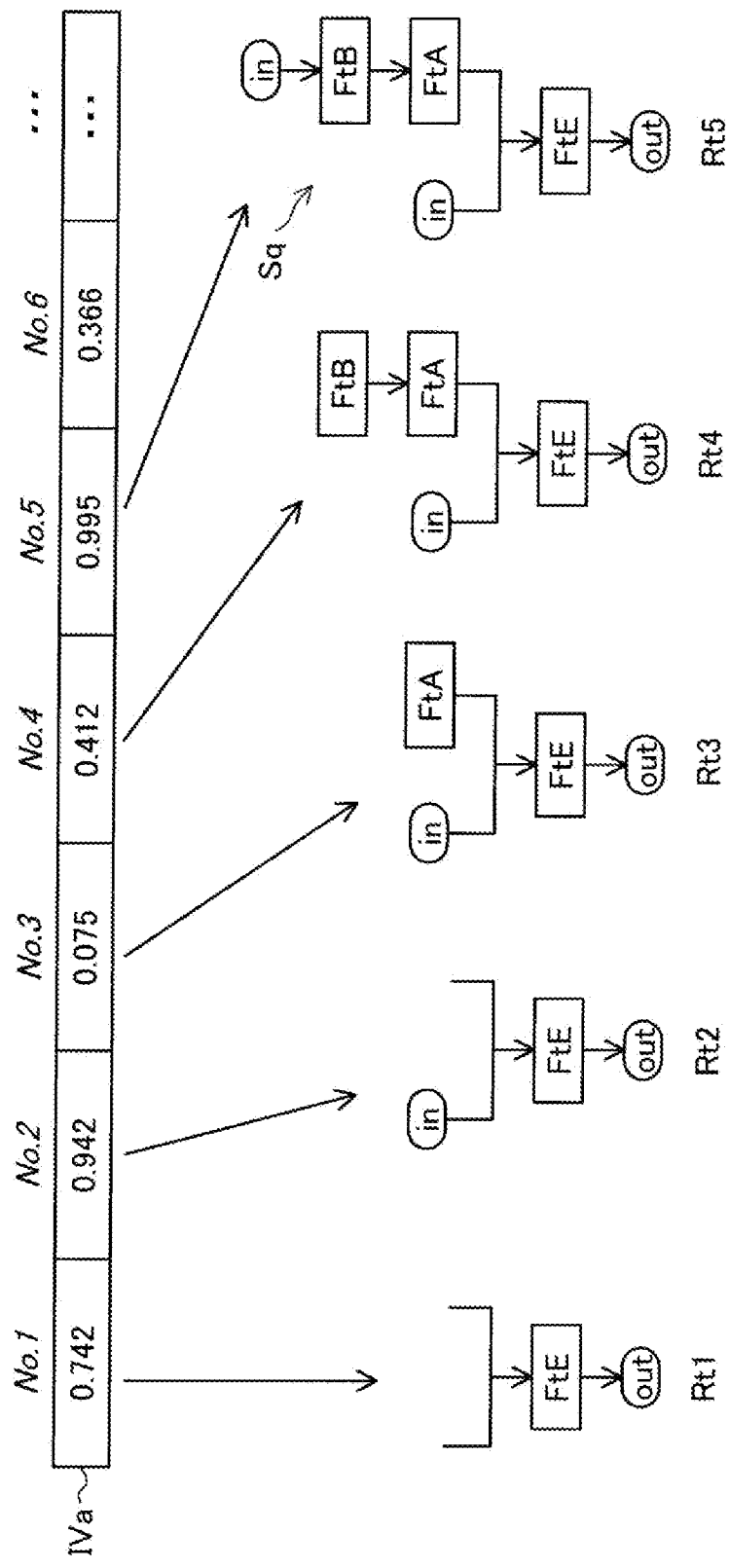
FIG. 14 is a first diagram illustrating processing from step S316 to step S322.

The selection of input-side sequence elements using the selection algorithm described above will be described below using a specific example of the generation of an image processing sequence Sq from an individual IVa. FIG. 14 is a first diagram illustrating the processing from step S316 to step S322 in FIG. 13. FIG. 15 is a second diagram illustrating the processing from step S316 to step S322 in FIG. 13. FIG. 16 is a third diagram illustrating the processing from step S316 to step S322 in FIG. 13. FIG. 17 is a fourth diagram illustrating the processing from step S316 to step S322 in FIG. 13. FIG. 18 is a fifth diagram illustrating the processing from step S316 to step S322 in FIG. 13.

As illustrated in FIG. 14, in a first routine Rt1, the gene translation unit 34 selects an image output layer "out" as a connection destination in step S316. Next, the gene translation unit 34 calculates the upper limit threshold value $T_{ij}$ by using the average value ARV of the element set in which the output-side sequence element of the reference table 88 illustrated in FIG. 7 is the image output layer "out" and the above-described Equations (2) and (3), thereby determining a numerical value range in which the input-side sequence element appears. As illustrated in FIG. 15, the gene translation unit 34 executes the selection algorithm. Thereby, the gene translation unit 34 sets a wider numerical value range indicating an appearance range for an input-side sequence element having a higher average value ARV which is a connection reference value RV for each input-side sequence element of an element set in which an output-side sequence element is the image output layer "out". Thereby, the image processing sequence Sq having the above-described connection relationship is generated. The gene translation unit 34 compares a numerical value 0.742 of a gene of No. 1 illustrated in FIG. 14 with the numerical value range illustrated in FIG. 15 to select the image processing filter FtE corresponding to the numerical value range as an input-side sequence element of an image output layer "out". In addition, since the number of inputs of the image processing filter FtE is "2", the gene translation unit 34 sets two search branches on the input side of the image processing filter FtB with reference to the reference table 88.

As illustrated in FIG. 14, in the next routine Rt2, the gene translation unit 34 selects the image processing filter FtE as a connection destination in step S316. Next, the gene translation unit 34 calculates the upper limit threshold value $T_{ij}$ by using the average value ARV of the element set in which the output-side sequence element of the reference table 88 illustrated in FIG. 7 is the image processing filter FtE and the above-described Equations (2) and (3), thereby determining a numerical value range of the input-side sequence element. As illustrated in FIG. 16, the gene translation unit 34 executes the selection algorithm. Thereby, the gene translation unit 34 sets a wider numerical value range indicating an appearance range for an input-side sequence element having a higher average value ARV for each input-side sequence element of an element set in which an output-side sequence element is the image processing filter FtE. The gene translation unit 34 compares a numerical value 0.942 of a gene of No. 2 illustrated in FIG. 14 with the numerical value range illustrated in FIG. 16 to select the image input layer "in" corresponding to the numerical value range as an input-side sequence element on the left side of the image processing filter FtB.

As illustrated in FIG. 14, in the next routine Rt3, the gene translation unit 34 selects the image processing filter FtE as a connection destination in step S316. Next, the gene translation unit 34 calculates the upper limit threshold value $T_{ij}$ by using the average value ARV of the element set in which the output-side sequence element of the reference table 88 illustrated in FIG. 7 is the image processing filter FtE and the above-described Equations (2) and (3), thereby determining a numerical value range of the input-side sequence element. Since the numerical value range is the same as that in FIG. 16, the gene translation unit 34 uses the numerical value range used in the previous routine Rt2. The gene translation unit 34 compares a numerical value 0.075 of a gene of No. 3 illustrated in FIG. 14 with the numerical value range illustrated in FIG. 16 to select the image processing filter FtA corresponding to the numerical value range as an input-side sequence element on the right side of the image processing filter FtB. In addition, since the number of inputs of the image processing filter FtA is "1", the gene translation unit 34 sets one search branch on the input side of the image processing filter FtA with reference to the reference table 88.

As illustrated in FIG. 14, in the next routine Rt4, the gene translation unit 34 selects the image processing filter FtA as a connection destination in step S316. Next, the gene translation unit 34 calculates the upper limit threshold value $T_{ij}$ by using the average value ARV of the element set in which the output-side sequence element of the reference table 88 illustrated in FIG. 7 is the image processing filter FtA and the above-described Equations (2) and (3), thereby determining a numerical value range of the input-side sequence element. As illustrated in FIG. 17, the gene translation unit 34 executes the selection algorithm. Thereby, the gene translation unit 34 sets a wider numerical value range indicating an appearance range for an input-side sequence element having a higher average value ARV for each input-side sequence element of an element set in which an output-side sequence element is the image processing filter FtA. The gene translation unit 34 compares a numerical value 0.412 of a gene of No. 4 illustrated in FIG. 14 with the numerical value range illustrated in FIG. 17 to select the image processing filter FtB corresponding to the numerical value range as an input-side sequence element of the image processing filter FtA. In addition, since the number of inputs of the image processing filter FtB is "1", the gene translation unit 34 sets one search branch on the input side of the image processing filter FtA with reference to the reference table 88.

As illustrated in FIG. 14, in the next routine Rt5, the gene translation unit 34 selects the image processing filter FtB as a connection destination in step S316. Next, the gene translation unit 34 calculates the upper limit threshold value $T_{ij}$ by using the average value ARV of the element set in which the output-side sequence element of the reference table 88 illustrated in FIG. 7 is the image processing filter FtB and the above-described Equations (2) and (3), thereby determining a numerical value range of the input-side sequence element. As illustrated in FIG. 18, the gene translation unit 34 executes the selection algorithm. Thereby, the gene translation unit 34 sets a wider numerical value range indicating an appearance range for an input-side sequence element having a higher average value ARV for each input-side sequence element of an element set in which an output-side sequence element is the image processing filter FtB. The gene translation unit 34 compares a numerical value 0.995 of a gene of No. 5 illustrated in FIG. 14 with the numerical value range illustrated in FIG. 18 to select the image input layer "in" corresponding to the numerical value range as an input-side sequence element of the image processing filter FtB. Thereby, all of the nodes on the upstream side become the image input layer "in", and thus the generation of the image processing sequence Sq is completed. That is, when there is no input-side sequence element that is not connected to the output-side sequence element, the gene translation unit 34 terminates the processing for generating an image processing sequence Sq corresponding to an individual IV even when all of a plurality of genes constituting the individual IV are not used as the image processing sequence Sq. Thereby, the gene translation unit 34 can generate the image processing sequence Sq even when all of the plurality of genes are not used.

Figure 19:
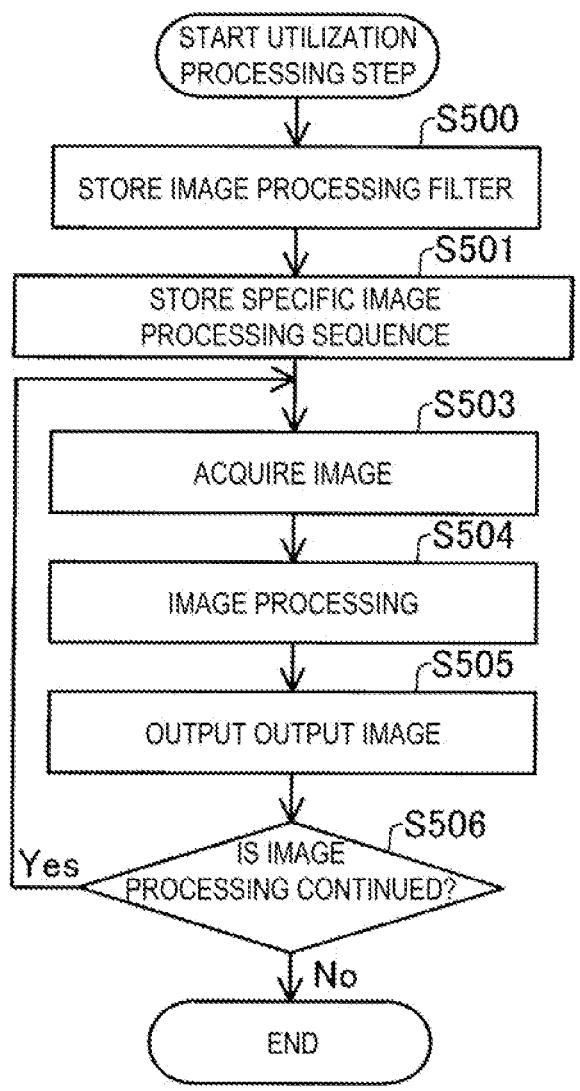
FIG. 19 is a flowchart of utilization processing.

FIG. 19 is a flowchart illustrating utilization processing. The utilization processing is executed after a specific image processing sequence DSq is specified by the generation processing in FIG. 12. First, in step S500, the storage device 70 stores a plurality of image processing filters received by the input unit 150 as the image filter group 80. The plurality of image processing filters of the image filter group 80 stored in step S500 may be only image processing filters used in the specific image processing sequence DSq. Note that, when the utilization processing and the generation processing in FIG. 12 are executed by the same generation device 20, step S500 can be omitted, and the image filter group 80 stored in the storage device 70 in step S300 can be used.

Next, in step S501, the storage device 70 stores the specific image processing sequence DSq output in step S358 of FIG. 12. Note that the order of step S500 and step S501 is not limited to the above-described order.

Next, in step S503, the image processing unit 40 reads out and acquires an image which is stored in the storage device 70 via the input unit 150 and which is to be subjected to image processing of the specific image processing sequence DSq. The image acquired in step S503 is, for example, an image obtained by imaging an object of the same type as the learning image LM. Note that, when there are a plurality of images to be subjected to image processing, the image processing unit 40 may acquire an image by reading out one of the plurality of images stored in advance in the storage device 70, or may acquire a target image from the imaging device 200 each time when image processing to be described later is executed.

Next, in step S504, the image processing unit 40 executes image processing using the specific image processing sequence DSq on the image acquired in step S503. That is, image processing is executed on an image by applying the image processing filters stored in the image filter group 80 of the storage device 70 in accordance with the order indicated by the specific image processing sequence DSq.

Next, in step S505, an output image PM, which is an image after the image processing using the specific image processing sequence DSq, is output. Step S505 is executed, for example, by storing the output image PM in the storage device 70 or displaying the output image PM on the display unit 160.

Next, in step S506, the image processing unit 40 determines whether or not to continue the image processing using the specific image processing sequence DSq. For example, the image processing unit 40 determines to continue the image processing when information indicating the continuation of the image processing is input by the user or when an unprocessed image to be subjected to the image processing still remains in the storage device 70. When the image processing is to be continued, the processing of step S503 and the processing of the subsequent steps are executed again. On the other hand, when information indicating the termination of the image processing is input from the user or when an unprocessed image to be subjected to the image processing does not remain in the storage device 70, the image processing unit 40 terminates the utilization processing.

According to the above-described embodiment, it is possible to generate a plurality of image processing sequences Sq for an output-side sequence element so as to have a probability relationship in which a connection probability of being connected to the output-side sequence element increases as an input-side sequence element has a higher connection reference value RV by using the reference table 88. Thereby, it is possible to more efficiently specify an image processing sequence Sq that satisfies a reference condition without increasing the number of image processing sequences Sq to be generated. That is, since the image processing sequence Sq that satisfies the reference condition can be specified with a smaller number of image processing sequences Sq, it is possible to reduce a processing time until the image processing sequence Sq that satisfies the reference condition is specified. In particular, when a more complicated specific image processing sequence DSq is generated by increasing the number of types of image processing layers that are candidates for sequence elements or increasing a genetic length, it is possible to suppress an increase in the processing time due to expansion of the search space for an image processing sequence by using the reference table 88. In addition, according to the above-described embodiment, a common reference table 88 can be used for specifying a specific image processing sequence DSq for achieving a similar purpose. For example, a case where the purpose of determining whether or not there is a defective portion DA is common, but a target product is different, a case where the purpose of determining a non-defective product or a defective product of a printed medium is common, but the type of a printed medium to be determined is different, and the like correspond to the above description.

In addition, according to the above-described embodiment, as shown in the above-described Equations (2) and (3) and FIGS. 15 to 18, a plurality of image processing sequences Sq are generated such that a ratio between average values ARV as connection reference values RV is a ratio between connection probabilities, that is, a ratio of a numerical value range. Thereby, it is possible to increase the possibility that an element set having high connection compatibility will be included in an image processing sequence Sq, and thus it is possible to more efficiently specify an image processing sequence Sq that satisfies a reference condition. Further, according to the above-described embodiment, as shown in the above-described Equations (2) and (3) and FIGS. 15 to 18, a wider numerical value range is set for an input-side sequence having a higher average value ARV as a connection reference value RV, and thus it is possible to increase the probability that an input-side sequence element having a high connection reference value RV will be set as a sequence element connected to an output-side sequence element. Thereby, it is possible to more efficiently specify an image processing sequence that satisfies a reference condition. In addition, according to the above-described embodiment, the reference table generation unit 55 generates the reference table 88 using the degree of similarity SD as a connection reference value RV, and thus it is possible to generate a connection reference value RV in which the compatibility of connection, that is, the compatibility of an element set for obtaining a desired image is reflected.

B. Other Embodiments

B-1. Another Embodiment 1

In the above-described embodiment, processing results are sequentially evaluated in the order of a plurality of image processing sequences Sq indicated by a plurality of individuals IV belonging to one generation G, but processing results of a plurality of image processing sequences Sq may be evaluated in parallel using a plurality of generation devices 20.

B-2. Another Embodiment 2

In the above-described embodiment, the image processing sequence Sq is represented by the individual IV and the gene table 82 in the processing for generating a reference table, but the present disclosure is not limited thereto. For example, in the processing for generating a reference table, the image processing sequence Sq may be represented by a table in which a plurality of sequence elements and a connection relationship between the sequence elements are defined. Further, in the processing for generating a reference table, the sequence generation unit 30 generates a plurality of image processing sequences Sq using a genetic algorithm, but the generation method is not limited thereto. A plurality of sequence elements may be randomly disposed to generate a plurality of image processing sequences Sq.

B-3. Another Embodiment 3

In the above-described embodiment, the reference table 88 is generated in the processing for generating a reference table illustrated in FIG. 9, and the reference table is not updated in the processing for generating a specific image processing sequence, but the present disclosure is not limited thereto. For example, when the processing for generating a specific image processing sequence is performed, the reference table 88 may be updated based on the evaluation values EV calculated in step S352 of FIG. 12.

B-4. Another Embodiment 4

In the above-described embodiment, the gene translation unit 34 generates a plurality of image processing sequences for an output-side sequence element so as to have a probability relationship in which a connection probability of being connected to the output-side sequence element increases as an input-side sequence element has a higher connection reference value RV by using the reference table 88 and Equations (2) and (3), but the present disclosure is not limited thereto. For example, the gene translation unit 34 may not use Equations (2) and (3) as long as the gene translation unit 34 can generate a plurality of image processing sequences so as to have the above-described probability relationship. For example, the gene translation unit 34 may generate a plurality of image processing sequences so as to have the above-described probability relationship by setting a larger numerical value range in which an input-side sequence element appears in a stepwise manner as a connection reference value RV becomes larger.

C. Other Aspects

The present disclosure is not limited to the embodiments described above, and may be implemented in various modes without departing from the spirit of the disclosure. For example, the present disclosure can also be implemented achieved in the following aspects. Appropriate replacements or combinations may be made to the technical features in the above-described embodiments which correspond to the technical features in the aspects described below to solve some or all of the problems of the present disclosure or to achieve some or all of the advantageous effects of the present disclosure. Additionally, when the technical features are not described herein as essential technical features, such technical features may be deleted appropriately.

(1) According to a first aspect of the present disclosure, an image processing sequence generation method is provided. The image processing sequence generation method includes (a) generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, (b) performing image processing on a learning image by each of the plurality of image processing sequences to generate an output image for each of the plurality of image processing sequences, the output image being an image after the image processing, (c) comparing the output image with a target image associated with the learning image for each of the plurality of image processing sequences to calculate an evaluation value indicating a degree of similarity between the output image and the target image, and (d) using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein in the step (a), each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and the step (a) includes using the reference table to generate the plurality of image processing sequences so as to have a probability relationship where an input-side sequence element having a high connection reference value with respect to an output-side sequence element has a high connection probability of being connected to the output-side sequence element. According to this aspect, a plurality of image processing sequences can be generated for an output-side sequence element so as to have a probability relationship in which a connection probability of being connected to the output-side sequence element increases as an input-side sequence element has a higher connection reference value by using a reference table, and thus it is possible to more efficiently specify an image processing sequence that satisfies a reference condition without increasing the number of image processing sequences to be generated. Thereby, it is possible to reduce a processing time until the image processing sequence that satisfies the reference condition is specified.

(2) In the aspect described above, the step (a) may include generating the plurality of image processing sequences so that a ratio between the connection reference values of a plurality of the input-side sequence elements that are connection candidates for the same output-side sequence element is a ratio of the connection probability. According to this aspect, a plurality of image processing sequences are generated such that a ratio between connection reference values is a ratio between connection probabilities, and thus it is possible to increase the possibility that an element set having high connection compatibility will be included in the image processing sequence. Thereby, it is possible to more efficiently specify an image processing sequence that satisfies a reference condition.

(3) In the above-described aspect, the plurality of genes constituting the individual may be represented by numerical values, the step (a) may include disposing the image output layer at an end portion on the output side and connecting the sequence element from the output side to the input side to generate the image processing sequence, the step (a) may include setting different numerical value ranges for the image input layer and each of the plurality of image processing layers to select a corresponding image input layer or image processing layer as the sequence element when a numerical value of the numerical values of the plurality of genes is within one of the numerical value ranges, and the step (a) may include setting a wide numerical value range to the input-side sequence element having a large connection reference value with respect to the output-side sequence element, to generate the plurality of image processing sequences having the probability relationship. According to this aspect, a wider numerical value range is set to an input-side sequence having a higher connection reference value, and thus it is possible to increase the probability that an input-side sequence element having a high connection reference value is set as a sequence element. Thereby, it is possible to more efficiently specify an image processing sequence that satisfies a reference condition.

(4) In the above-described aspect, the step (a) may include terminating generation processing of the image processing sequence corresponding to the individual even when all of the plurality of genes constituting the individual are not used as the image processing sequence, in a case in which no input-side sequence element is connected to the output-side sequence element. According to this aspect, an image processing sequence can be generated even when all of a plurality of genes are not used. Note that, in the above-described aspect, the step (a) may include terminating the processing for generating the image processing sequences corresponding to the individual by setting the image input layer in the input-side sequence element which is not connected to the output-side sequence element, when there is an unconnected input-side sequence element when all of the plurality of genes constituting the individual are used as the image processing sequences. In this manner, it is possible to reliably generate image processing sequences by using an individual.

(5) In the above-described aspect, the predetermined reference condition in the step (d) may be a condition that a highest degree of similarity among the plurality of degrees of similarity each indicated by a respective evaluation value of the plurality of evaluation values is equal to or greater than a predetermined termination threshold value, and the step (a) includes, when the predetermined reference condition is not satisfied, generating the sequence set by replacing one or more image processing sequences having a lower degree of similarity among the plurality of image processing sequences generated in a previous routine with new image processing sequence with a different combination of the sequence elements. According to this aspect, one or more image processing sequences having a low degree of similarity are replaced with new image processing sequences having different combinations of sequence elements, and thus it is possible to exclude the image processing sequences having a low degree of similarity from a processing target. Thereby, it is possible to more efficiently specify an image processing sequence that satisfies a reference condition.

(6) In the above-described aspect, the step (d) may include using the evaluation value obtained by calculating in the step (c) for the image processing sequence constituting the sequence set used up to a previous routine, without executing the step (b) and the step (c) for a same image processing sequence as the image processing sequence constituting the sequence set used up to the previous routine. According to this aspect, since it is not necessary to calculate an evaluation value again, it is possible to improve the processing efficiency of the generation method.

(7) In the above-described aspect, the reference table may be generated by using, as the connection reference value, a degree of similarity between the target image and the output image that is generated using each of the plurality of image processing sequences generated so as to have a relationship where the input-side sequence element is connected to the output-side sequence element with a random probability in the pair of sequence elements. According to this aspect, it is possible to increase the possibility that an element set having high connection compatibility will be included in an image processing sequence by using the degree of similarity as a connection reference value.

(8) According to a second aspect of the present disclosure, an image processing sequence generation device is provided. The generation device includes a sequence generation unit configured to generate a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, an image processing unit configured to perform image processing on a learning image by each of the plurality of image processing sequences to generate an output image for each of the plurality of image processing sequences, the output image being an image after the image processing, and an output evaluation unit configured to compare the output image with a target image associated with the learning image for each of the plurality of image processing sequences to calculate an evaluation value indicating a degree of similarity between the output image and the target image, wherein the output evaluation unit uses a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for each element set that is a pair of an input-side sequence element and an output-side sequence element connected to each other, and the sequence generation unit uses the reference table to generate the plurality of image processing sequences so as to have a probability relationship where an input-side sequence element having a high connection reference value with respect to an output-side sequence element has a high connection probability of being connected to the output-side sequence element. According to this aspect, a plurality of image processing sequences can be generated for an output-side sequence element so as to have a probability relationship in which a connection probability of being connected to the output-side sequence element increases as an input-side sequence element has a higher connection reference value by using a reference table, and thus it is possible to more efficiently specify an image processing sequence that satisfies a reference condition without increasing the number of image processing sequences to be generated. Thereby, it is possible to reduce a processing time until the image processing sequence that satisfies the reference condition is specified.

(9) According to a third aspect of the present disclosure, a computer program for causing a computer to execute generation of an image processing sequence is provided. The computer program causes the computer to execute functions including (a) generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other, (b) performing image processing on a learning image by each of the plurality of image processing sequences to generate an output image for each of the plurality of image processing sequences, the output image being an image after the image processing, (c) comparing the output image with a target image associated with the learning image for each of the plurality of image processing sequences to calculate an evaluation value indicating a degree of similarity between the output image and the target image, and (d) using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein in the function (a), each of the plurality of image processing sequences is represented by an individual formed with a plurality of genes arrayed and corresponding to the image input layer and each of the image processing layers, and a reference table that defines a connection relationship of the sequence element in the image processing sequence, the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and the function (a) includes using the reference table to generate the plurality of image processing sequences so as to have a probability relationship where an input-side sequence element having a high connection reference value with respect to an output-side sequence element has a high connection probability of being connected to the output-side sequence element. Thereby, it is possible to reduce a processing time until the image processing sequence that satisfies the reference condition is specified.

The present disclosure may be implemented in various forms other than the above-described forms. For example, the present disclosure can be implemented in the form of a non-transitory storage medium storing a computer program.

What is claimed is:

1. A generation method of an image processing sequence, comprising:
    generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other;
    performing image processing on a learning image by each of the plurality of image processing sequences to generate an output image for each of the plurality of image processing sequences, the output image being an image after the image processing;
    comparing the output image with a target image associated with the learning image for each of the plurality of image processing sequences to calculate an evaluation value indicating a degree of similarity between the output image and the target image; and
    using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein
    in the generating the sequence set, each of the plurality of image processing sequences is represented by an individual formed with a plurality of genes arrayed and corresponding to the image input layer and each of the image processing layers, and a reference table that defines a connection relationship of the sequence element in the image processing sequence,
    the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and
    the generating the sequence set includes using the reference table to generate the plurality of image processing sequences so as to have a probability relationship where an input-side sequence element having a high connection reference value with respect to an output-side sequence element has a high connection probability of being connected to the output-side sequence element.

2. The generation method according to claim 1, wherein the generating the sequence set includes generating the plurality of image processing sequences so that a ratio between the connection reference values of a plurality of the input-side sequence elements that are connection candidates for the same output-side sequence element is a ratio of the connection probability.

3. The generation method according to claim 1, wherein the plurality of genes constituting the individual are represented by numerical values,
    the generating the sequence set includes disposing the image output layer at an end portion on the output side and connecting the sequence element from the output side to the input side to generate the image processing sequence,
    the generating the sequence set includes setting different numerical value ranges for the image input layer and each of the plurality of image processing layers to select a corresponding image input layer or image processing layer as the sequence element when a numerical value of the numerical values of the plurality of genes is within one of the numerical value ranges, and
    the generating the sequence set includes setting a wide numerical value range to the input-side sequence element having a large connection reference value with respect to the output-side sequence element, to generate the plurality of image processing sequences having the probability relationship.

4. The generation method according to claim 3, wherein the generating the sequence set includes terminating generation processing of the image processing sequence corresponding to the individual even when all of the plurality of genes constituting the individual are not used as the image processing sequence, in a case in which no input-side sequence element is connected to the output-side sequence element.

5. The generation method according to claim 1, wherein the predetermined reference condition in the using a plurality of the degrees of similarity is a condition that a highest degree of similarity among the plurality of degrees of similarity each indicated by a respective evaluation value of the plurality of evaluation values is equal to or greater than a predetermined termination threshold value, and
    the generating the sequence set includes, when the predetermined reference condition is not satisfied, generating the sequence set by replacing one or more image processing sequences having a lower degree of similarity among the plurality of image processing sequences generated in a previous routine with new image processing sequence with a different combination of the sequence elements.

6. The generation method according to claim 5, wherein the using a plurality of the degrees of similarity indicated by a plurality of the evaluation values includes using the evaluation value obtained by calculating in the comparing the output image with a target image for the image processing sequence constituting the sequence set used up to a previous routine, without executing the performing image processing on a learning image and the comparing the output image with a target image for a same image processing sequence as the image processing sequence constituting the sequence set used up to the previous routine.

7. The generation method according to claim 1, wherein the reference table is generated by using, as the connection reference value, a degree of similarity between the target image and the output image that is generated using each of the plurality of image processing sequences generated so as to have a relationship where the input-side sequence element is connected to the output-side sequence element with a random probability in the pair of sequence elements.

8. An image processing sequence generation device, comprising:
a sequence generation unit configured to generate a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other;
an image processing unit configured to perform image processing on a learning image by each of the plurality of image processing sequences to generate an output image for each of the plurality of image processing sequences, the output image being an image after the image processing; and
an output evaluation unit configured to compare the output image with a target image associated with the learning image for each of the plurality of image processing sequences to calculate an evaluation value indicating a degree of similarity between the output image and the target image, wherein
the output evaluation unit uses a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition,
each of the plurality of image processing sequences is represented by an individual formed with a plurality of genes arrayed and corresponding to the image input layer and each of the image processing layers, and a reference table that defines a connection relationship of the sequence element in the image processing sequence,
the reference table is a table in which a connection reference value indicating compatibility of connection for outputting a desired image obtained by performing image processing on the image and targeted at the target image is determined for each element set that is a pair of an input-side sequence element and an output-side sequence element connected to each other, and
the sequence generation unit uses the reference table to generate the plurality of image processing sequences so as to have a probability relationship where an input-side sequence element having a high connection reference value with respect to an output-side sequence element has a high connection probability of being connected to the output-side sequence element.

9. A non-transitory computer-readable storage medium storing a computer program configured to cause a computer to execute generation of an image processing sequence, the computer program comprising:
(a) generating a sequence set constituted by a plurality of image processing sequences, the plurality of image processing sequences indicating combinations of (i) an image input layer configured to input an image, (ii) at least one image processing layer of a plurality of image processing layers, and (iii) an image output layer configured to output the image after image processing, as a sequence element, the sequence set being constituted by the plurality of image processing sequences with the combinations different from each other;
(b) performing image processing on a learning image by each of the plurality of image processing sequences to generate an output image for each of the plurality of image processing sequences, the output image being an image after the image processing;
(c) comparing the output image with a target image associated with the learning image for each of the plurality of image processing sequences to calculate an evaluation value indicating a degree of similarity between the output image and the target image; and
(d) using a plurality of the degrees of similarity indicated by a plurality of the evaluation values each corresponding to a respective image processing sequence of the plurality of image processing sequences, to specify an image processing sequence, of the plurality of image processing sequences, that satisfies a predetermined reference condition, wherein
in the function (a), each of the plurality of image processing sequences is represented by an individual formed with a plurality of genes arrayed and corresponding to the image input layer and each of the image processing layers, and a reference table that defines a connection relationship of the sequence element in the image processing sequence,
the reference table is a table in which a connection reference value indicating compatibility of connection for outputting a desired image obtained by performing image processing on the image and targeted at the target image is determined for an element set that is a pair of an input-side sequence element and an output-side sequence element connected to each other, and
the function (a) includes using the reference table to generate the plurality of image processing sequences so as to have a probability relationship where an input-side sequence element having a high connection reference value with respect to an output-side sequence element has a high connection probability of being connected to the output-side sequence element.

* * * * *